United States Patent
Chen et al.

(12) 
(10) Patent No.: US 6,313,262 B1
(45) Date of Patent: Nov. 6, 2001

(54) METHOD FOR PREPARING POLYETHER POLYOL AND COPOLYMER THEREOF

(75) Inventors: Shien Chang Chen, Taipei; Fu Shen Lin, Ta She Industrial Zone Kaohsiung; June Yen Chou, Ta Hwa Industrial Zone Kaohsiung; Liang An Hsu; Ming Hui Chu, both of Ta She Industrial Zone Kaohsiung; Chine Chung Huang, Ta Hwa Industrial Zone Kaohsiung; Ming Hsiung Shao, Ta She Industrial Zone Kaohsiung, all of (TW)

(73) Assignee: Dairen Chemical Corporation, Taipei (TW)

( * ) Notice: Subject to any disclaimer, the term of this patent is extended or adjusted under 35 U.S.C. 154(b) by 0 days.

(21) Appl. No.: 09/448,189

(22) Filed: Nov. 23, 1999

(30) Foreign Application Priority Data

May 19, 1999 (TW) ................................................. 88108146

(51) Int. Cl.$^7$ ............................ C08G 59/68; C08G 65/04
(52) U.S. Cl. ......................... 528/410; 528/486; 528/485; 528/488; 528/489
(58) Field of Search .................................... 528/410, 486, 528/485, 488, 489

(56) References Cited

U.S. PATENT DOCUMENTS

| 3,712,930 | | 1/1973 | Matsuda et al. | 260/615 |
|---|---|---|---|---|
| 4,568,775 | * | 2/1986 | Aoshima et al. | 568/617 |
| 4,658,065 | | 4/1987 | Aoshima et al. | 565/487 |
| 5,149,862 | | 9/1992 | Dorai et al. | 560/240 |
| 5,393,866 | | 2/1995 | Murai et al. | 528/403 |

FOREIGN PATENT DOCUMENTS 0 286 454   10/1988   (EP).

* cited by examiner

*Primary Examiner*—Duc Truong
(74) *Attorney, Agent, or Firm*—Peter F. Corless; Christine C. O'Day; Edwards & Angell, LLP

(57) ABSTRACT

The present invention is related to a method for preparing polyether polyol or copolymerized polyether polyol, which uses an acid catalyst consisting of heteropoly acidic salts and oxides and/or binders. It allows tetrahydrofuran and/or cyclic ether compounds to carry out the ring-opening polymerization or ring-opening copolymerization with/without telogen, and obtains polyether polyol or copolymerized polyether polyol. An acid catalyst is used in the present invention because of its low solubility in organic solvent, so its process is simpler and the catalyst is easy to recycle for repeated use. As well, its preparation process is highly advantageous.

29 Claims, No Drawings

METHOD FOR PREPARING POLYETHER POLYOL AND COPOLYMER THEREOF

FIELD OF THE INVENTION

The present invention is related to a method for preparing polyether polyol or copolymerized polyether polyol, which uses an acid catalyst consisting of heteropoly acidic salts and oxides and/or binders. It allows tetrahydrofuran and/or cyclic ether compounds to carry out the ring-opening polymerization or ring-opening copolymerization with/without telogen, and obtains polyether polyol or copolymerized polyether polyol. An acid catalyst is used in the present invention because of its low solubility in organic solvents, so its process is simpler and the catalyst is easy to recycle for repeated use. As well, its preparation process is highly advantageous.

BACKGROUND OF THE INVENTION

Polyether polyol or copolymerized polyether polyol is a long chain polyol having hydroxyl terminal groups, and may be used for the soft segment of thermoplastic polyester resins and polyurethane (PU) elastomer and raw material of elastic fibers (Spandex), synthetic leathers ,etc.

The method for preparing polyether polyol or copolymerized polyether polyol essentially uses one or more cyclic ethers to carry out the ring-opening polymerization or ring-opening copolymerization. This process needs a proton acid having strong acidity, such as perchloric acid, fluorosulfonic acid and the like, or a Lewis acid, such as boron chloride, aluminum chloride, antimony pentachloride and the like, as a catalyst; sometimes the process even needs an activator, such as carboxylic anhydride and the like.

The polyether polyol which has been produced and used for Spandex fibers in the industry primarily introduces polytetramethylene ether glycol ( hereinafter abbreviated as PTMEG). This reaction was first reported by Meerwein et al. (Angew. Chem. 72, 927 ( 1960) ) 3 PTMEG can be produced by polymerization of tetrahydrofuran (hereinafter abbreviated as ITHF) But because PTMEG is easy to crystallize at low temperatures and results in poor physical properties, the physical properties at low temperatures may be improved by adding other cyclic ether comonomers, such as propylene oxide.

U.S. Pat. No. 3,712,930 has disclosed a method for preparing polyether polyol in the presence of fuming sulfuric acid as a catalyst, but this method produces only products of molecular weight lower than 1000. In addition, U.S. Pat. No. 2,751,419, U.S. Pat. No. 5,393,866, and JP 52-32799 have disclosed methods of using fluorosulfonic acid as a catalyst, but these methods need hydrolysis after the reaction to obtain polyether polyol. However, fluorine-contained catalysts may yield fluorine-contained by-products which is difficult to separate Also fluorosulfonic acid reacts with water to produce hydrofluoric acid and sulfuric acid, the expensive fluorosulfonic acid is consumed in this process so that this process is at a disadvantage in cost of preparation. Furthermore, another disadvantage of this process is that hydrofluoric acid and sulfuric acid must be treated so that the use of expensive anti-corrosive equipment is necessary, such as glass lining equipment which subjects to instrumental scale-up limitation, and the productive efficiency of the equipment can not be increased so that there is a high investment in equipment. Also, because a large amount of waste water is produced, the subsequent waste water treatment process further increases manufacturing cost.

U.S. Pat. No. 5,149,862 has disclosed a method for using $ZrO_2/SO_4^{2-}$ as a catalyst, but the polymerization rate is so slow( the conversion in 19 hours is only 6% )that acetic acid/ acetic anhydride must be used to accelerate the reaction. U.S. Pat. No. 4,120,903 has disclosed a method of using Nafion® resin as a catalyst, but the resin is not easily prepared and lacks long-term stability and reactivity. In addition, EP-A-286454 has disclosed a method of using a Lewis acid or a proton acid as a catalyst; for example, antimony pentafluoride, silver tetrafluoroborate or trifluoromethanesulfonic acid can all be used as catalysts. Because the acidity of these catalysts is very strong, and use of special anti-corrosive equipment makes the process uneconomical.

Moreover, there have been various methods of preparing polyether polyol or copolymerized polyether polyol; for example, perchloric acid-acetic anhydride system is used in JP 45-13940; sulfuric acid-acetic anhydride system is used in JP 52-32680; fluorosulfonic acid-acetic anhydride system in JP 54-3718; and fluorinated sulfonic resin, Nafion®, -acetic anhydride system is used in U.S. Pat. No. 4,153,786 Also, Lewis acid and an activator system have been used as catalysts; for example, boron fluoride-acetic anhydride system has been used in WP 52-32797; and solid acids, such as $ZrO_2/SO_4^{2-}$; -acetic acid/acetic anhydride system have been used in U.S. Pat. No. 5,149,862. The above-mentioned methods which have been disclosed are two-step reactions, that is, after the reaction in these catalyst systems, polyether polyol with ester groups is obtained instead of hydroxyl terminal groups. Thereafter polyether polyol is obtained through alcoholysis or transesterification, so that the process is more complicated and the cost is higher.

Furthermore, JP 63-30931, JP 63-30932, U.S. Pat. No. 4,568,775 and USP 4,658,065 have disclosed a method for preparing polyether polyol or copolymerized polyether polyol, which uses heteropoly acid as a catalyst. This is a one-step process, and directly obtains polyether polyol or copolymerized polyether polyol with hydroxyl terminal groups, but the number of water of hydration of heteropoly acid should be strictly controlled. Because heteropoly acid has a certain degree of solubility in the organic phase, heteropoly acid still remains in the product. If using a base for neutralization, the catalyst can not be reused. If water is used to extract heteropoly acid, polyether polyol or copolymerized polyether polyol is not easily stratified because it is easily emulsified by water, and separation can only be completed with difficulty. It is necessary to use hydrocarbon solvents, such as n-octane, to remove residual heteropoly acid and treat with an adsorbent, such as active carbon, as has been disclosed in EP 181621 to provide commercial products. Hence, a complicated treatment procedure for separation and purification is required with an expensive and difficult preparation process According to the above, it is understood that defects are present in each of the existing processes which call for improvement. In order to solve the above-mentioned problems, the inventors of the present invention extensively studied heteropoly acidic catalysts, and found that if using catalysts synthesized from heteropoly acidic salts and oxides and/or binders, the target product polyether polyol or copolymerized polyether polyol will be directly produced. In this way, the present invention is achieved.

According to the present invention, it is an advantage that the corrosion of catalysts is low, the catalyst may be separated from the organic phase. Thus it is only necessary to distill off solvent and unreacted monomer in the organic phase to obtain a polyether polyol or copolymerized polyether polyol with hydroxyl terminal groups. Furthermore, without using any other promoter, the unreacted monomer may be recycled to the process for reuse.

Moreover, because the catalysts of the present invention have low solubility in the organic phase, there are no problems of any remaining heteropoly acidic salts in the product, so a complicated procedure for treating the solvent during the preparation process is not necessary. Furthermore, after reaction, it is only necessary to separate the catalysts by filtration or centrifigation. If the catalysts of the present invention are used as the catalyst of the fixed bed reactor, complicated separation procedures for catalysts and products may be avoided, and it is only necessary to distill off unreacted monomer to directly obtain polyether polyol or copolymerized polyether polyol without filtration Without using any other promoter, such as carboxylic anhydride, the unreacted monomer may be recycled to the preparation process for reuse through reduced distillation so that the process is simpler. According to the present invention, the molecular weight of products ranges from 500 to 3000, which is suitable for use as raw material of polyurethane elastomer, synthetic leathers, elastic fibers, etc. The merits of the present invention are a simple preparation process, a small amount of waste water, a low investment in equipment, and an inexpensive cost of preparation.

SUMMARY OF THE INVENTION

The present invention is related to a method for preparing polyether polyol or copolymerized polyether polyol, which uses an acid catalyst consisting of heteropoly acidic salts and oxides and/or binders. It allows tetrahydrofuran and/or cyclic ether compounds to carry out the ring-opening polymerization or ring-opening copolymerization with/without telogen, and obtains polyether polyol or copolymerized polyether polyol.

Heteropoly acid is a solid acid which had been used extensively in place of liquid acids, such as fluorosulfonic acid or sulfuric acid due to its low pollution and strong acidity. However, heteropoly acid has substantial solubility in water or polar solvent, heteropoly acid remains in the products in some process. At the same time, because of its solubility, heteropoly acid is difficult to be used as a fixed bed catalyst.

However, heteropoly acidic salts are extensively used in esterification, hydration and hydrolysis due to their porous structure and surface acidity. Heteropoly acidic salts may be classified into two groups because of its different cations, i.e., one group of salts has a small cation radius, such as sodium salts and the like, and these salts have high solubility in water, while the other group of salts has a large cation radius, such as rubidium salts, cesium salts and the like. These salts have low solubility in water, but easily form extremely fine particles during preparation, so they are easy to disperse in water or organic solvents. In order to solve the above mentioned problems, the inventors of the present invention used oxides and/or binder to immobilize heteropoly acidic catalysts, and used them as a fixed bed catalyst. At the same time, because heteropoly acidic catalysts have a low solubility in the polar solvent, separation problems do not occur so that there is an advantage in preparation.

Heteropoly acidic salts used in the present invention include, for example, ammonium salts, alkali metal, such as lithium, sodium, potassium, rubidium, cesium and the like; alkaline earth metal salts; and the salts of boron, aluminum, indium, copper, chromium, nickel, bismuth, zirconium and the like. The heteropoly acidic salts may generally be obtained by using a solution of metal hydroxide, chloride, carbonate or nitrate, and heteropoly acid aqueous solution in stoichiometric proportion to carry out the reaction, and then evaporate to dryness. They may also be obtained by using metal alkoxides and heteropoly acid in ether to carry out co precipitation where the obtained salts are then washed with water and dried. Ammonia gas, ammonia water or urea and the like may also be used in preparing ammonium salts.

Heteropoly acids that are used to prepare heteropoly acidic salts in the present invention include with, for example, oxyacids containing at least one element selected from molybdenum, tungsten and vanadium, and oxyacids containing at least one element selected from phosphorous, silicon, boron, arsenic, germanium in condensation, wherein the former and the latter elements are in the ratio of 2.5 to 12 by numbers of atom, preferably 9 to 12. The examples of heteropoly acid include, for example, 12-molybdophosphoric acid ($H_3PMo_{12}O_{40}$), 12-tungstophosphoric acid ($H_3PW_{12}O_{40}$), 12-tungstosilicic acid ($H_4SiW_{12}O_{40}$), 12-molybdosilicic acid ($H_4SiMo_{12}O_{40}$), 12-tungstoboric acid ($H_5BW_{12}O_{40}$), 12-vanadatophosphoric acid ($H_7PV_{12}O_{36}$), 12-tungstoarsenic acid ($H_3AsW_{12}O_{40}$), 12-tungstogermanic acid ($H_4GeW_{12}O_{40}$), 18-tungsto-2-phosphoric acid ($H_6P_2W_{18}O_{62}$), 18-tungsto-2-arsenic acid ($H_6As_2W_{18}O_{62}$), 18-molybdo-2-phosphoric acid ($H_6P_2Mo_{18}O_{62}$), 18-molybdo-2-arsenic acid ($H_6As_2Mo_{18}O_{62}$), 9-molybdophosphoric acid ($H_3PMo_9O_{31}$), 10-molybdatodivanadatophosphoric acid ($H_5Mo_{10}V_2O_{40}$), 11-molybdo-1-vanadophosphoric acid ($H_4PMo_{11}VO_{40}$) and the like.

The examples of oxides used in the present invention include, for example, titanium oxide ($TiO_2$), zirconium oxide ($ZrO_2$), vanadium oxide ($V_2O_5$), antimony trioxide($Sb_2O_3$), silica( $SiO_2$), aluminum oxide( $Al_2O_3$), molybdenum oxide( $MoO_3$) and tungsten trioxide( $WO_3$)and the like. Oxides may be used alone or in combination of two or more, as for example, titanium oxide-zirconium oxide, silica-aluminum oxide, silica-titanium oxide, silica-zirconium oxide and the like.

Metal oxides may also be obtained by using chlorides, such as titanium chloride, nitrate, oxychloride, such as zirconium oxychloride, and the like thereof, and ammonia water to carry out precipitation, or by using esters, such as titanium tetraisopropylate, to carry out hydrolysis, producing hydroxide at first and then calcining. Silica may be used in the form of a solid, powder or colloidal solution, for example, which is obtained by using Ludox® (commercially available from Du Pont) or tetraethyl orthosilicate to carry out hydrolysis. Aluminum oxide includes α-alumina, β-alumina and the like, and its form may be a solid, powder or colloidal solution or may be obtained by aluminum alkoxide hydrolysis.

In the present invention, heteropoly acidic salts and oxides are used in the method that, for example, heteropoly acidic salts and oxides are directly mixed; in the method of carrying out catalytic synthesis together with heteropoly acidic salts, the above-mentioned metal salt solution and oxides, on the one hand, forms heteropoly acidic salts, on the other hand, oxides are comprised therein; or in the impregnation method, heteropoly acid is impregnated on the surface of oxides at first, then the above-mentioned metal salt solution is used to allow heteropoly acid on the surface of oxides to react and form heteropoly acidic salts.

The typical examples of binders include, for example, starch, methyl cellulose, hydroxyethyl cellulose, polyvinyl alcohol, ethylene-vinyl alcohol copolymer, ethylene-vinyl acetate copolymer, silicone resin and the like. The catalysts may be shaped by granulation or by extrusion using a piston extrusion press or a single screw or double screw extruder. The catalysts are first mixed with the binder and optionally worked up into a kneadable mass. The dry or slight moist kneadable mass is moulded to produce particular shapes, e.g., cylinders, granular, pellet or other particular shape. The amount of the added binder is in the ratio of 0.5% to 99.5%, general preferably 1% to 50%, against the weight of the powder to be formed.

Oxides and heteropoly acidic salts in the present invention are in the ratio of 1/100 to 100/1, preferably 1/20 to 20/1 by weight If heteropoly acidic salts are supported on the surface of oxides by impregnation, the obtained catalyst may be used for the fixed bed reaction.

Cyclic ethers used in the present invention include 3 to 6 members and may be represented in the following formula:

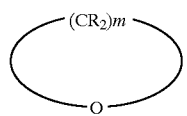

Wherein each of R may be identical or different and may represent a hydrogen atom, halogen, $C_{1-10}$ alkyl, phenyl, and substituted phenyl or halogenated $C_{1-10}$ alkyl respectively, and where m is an integer from 2 to 5.

In the above formula, halogen represented by R includes fluorine, chlorine, bromine, iodine and the like.

$C_{1-10}$ alkyl represented by R includes alkyl with straight chain or branched chain, such as methyl, ethyl, n-propyl, isopropyl, n-butyl, sec-butyl, tert-butyl, pentyl, hexyl, heptyl, otyl, nonyl, decyl and the like.

Halogenated $C_{1-10}$ alkyl represented by R includes the substituted above-mentioned hydrogen in the above-mentioned $C_{1-10}$ alkyl, such as chloromethyl, bromomethyl, iodomethyl, dichloromethyl, 2-chloroethyl, 3-chloropropyl and the like.

The examples of cyclic ether include, for example, ethylene oxide, 1,2-propylene oxide, epichlorohyrin, epibromohydrin, 1,2-butylene oxide, 2,3-butylene oxide, isobutylene oxide, oxetane, 3-methyloxetane, 3,3-dimethyloxetane, tetrahydrofuran, 2-methyltetrahydrofian, 3-methyltetrahydrofuran, tetrahydropyran, and the like.

When preparing polyether polyol or copolymerized polyether polyol, telogen may also be properly added to adjust the molecular weight of the products. The examples of telogen include, for example, water or aliphatic alcohol, such as 1,4-butanediol, 1,3-propanediol, ethanediol, methanol, ethanol, propanol, isopropanol and the like, oligomer in low molecular weight, such as PTMEG in the molecular weight of 200 to 800. The amount of telogen may depend on the molecular weight of the desirable products.

The reactor of application in the present invention may be batch or continuous stir reactors. The amount of the catalyst employed for stir reactors is not particularly limited. The amount of catalyst usually ranges from 1/100 to 10 times, preferably 1/10 to 1 times, against the weight of the cyclic ether. Before using the catalyst, it is better to calcine the catalyst under air, nitrogen gas, helium gas or other inert gas from 100 ° C. to 320° C. for 0.5 to 10 hours. When using stir reactors, the reaction temperature should preferably be from 0° C. to 100° C., particularly from 30° C. to 80° C. If the temperature is too high, degree of polymerization will tend to decrease, if the temperature is too low, the reaction rate will be too slow without practical value. The reaction pressure may be atmospheric pressure, increased pressure or reduced pressure. The reaction time may depend on the catalysts used, thea of cysts, the reaction temperature and so on.

If using fixed bed reactors to carry out the reaction, the reaction temperature should preferably be from 0° C. to 100° C., particularly from 30° C. to 80° C. If the temperature is too high, degree of polymerization will tend to decrease, if the temperature is too low, the reaction rate will be too slow without practical value. The reaction pressure may be atmospheric pressure, increased pressure or reduced pressure. The weight hourly space velocity of feeding the cyclic ether is 0.005 to 5 $hr^{-1}$, preferably 0.1 to 2 $hr^{-1}$. If using fixed bed reactors, the complicated separation process can be avoided, and it is only necessary to distill off the unreacted monomer so that polyether polyol is directly obtained. Without using any other promoter, such as carboxylic anhydride, the unreacted monomer may be recycled to the preparation process for reuse through reduced distillation.

The present invention is embodied to explain by following examples, but the range of the present invention is not limited. The number average molecular weight (Mn) and molecular weight distribution (Mw/Mn) are determined by gel permeation chromatography (GPC) . Yield and molecular weight distribution are calculated respectively by the following equations:

$$\text{Yield}(\%) = \frac{\text{Weight of Polyether Polyol or Copolymerized Polyether Polyol Obtained after Reaction}}{\text{Weight of Reactant (Cyclic Ether)}} \times 100\%$$

$$\text{Molecular Weight Distribution}\left(\frac{Mw}{Mn}\right) = \frac{\text{Weight-Average Molecular Weight}}{\text{Number-Average Molecular Weight}}$$

EXAMPLE

Example 1

Dodecatungstophosphoric acid ($H_3PW_{12}O_{40} \cdot 29H_2O$) (30 g) (commercially available from Nippon Inorganic Colour and Chemical Co.) was dissolved in pure water (110 g ) to prepare 0.08M Dodecatungstophosphoric acid solution, while ammonium carbonate(0.424 g)was dissolved in pure water( 177 g)to prepare 0.025M ammonium carbonate solution. When the prepared ammonium carbonate solution was added to the dodecatungstophosphoric acid solution dropwisely, the mixture was stirred at room temperature for a half hour. Into a glass reactor with a stirrer and reflux condenser, the mixture was stirred and heated at 80° C. for 8 hours. After dryness, ammonium dodecatungstophosphate( $(NH_4)H_2PW_{12}O_{40})(25.5$ g)powder was obtained. The above synthetic ammonium dodecatungstophosphate (10 g) was mixed uniformly with titanium oxide ($TiO_2$) (5 g) and treated in the oven under a nitrogen gas atmosphere at 19° C. for 2 hours prior to use. Into a glass reactor with a stirrer and reflux condenser, the catalyst and tetrahydrofuran (THF) (100 g) with 300 ppm water content were stirred and heated at 60° C. for 6 hours. After the completion of the reaction, the catalyst was filtrated off, then the unreacted monomer THF was distilled off. The transparent and viscous product of polytetramethylene ether glycol (PTMEG) with Mn=1680, Mw/Mn=1.9 was obtained. The yield was 11%

Example 2

Dodecatungstophosphoric acid (27.2 g), cesium carbonate (3.26 g), tetraethyl orthosilicate (Si $(OC_2H_5)_4$) (20 g), pure water (36 g) and 95% ethyl alcohol (36 g) were placed into a glass reactor with a stirrer and reflux condenser. The mixture was stirred at room temperature for 30 minutes, then placed into a water bath at 80° C. and heated for 2 hours. After dryness, the solid was pulverized to fine to powder, washed with pure water (20 g), and dried at 100° C. in the oven. Into a glass reactor with a stirrer and reflux condenser, the above prepared catalyst and THF(100 g)with 300 ppm water content were stirred and heated at 60° C. for 5 hours. After the completion of the reaction, the catalyst was removed; the unreacted monomer was distilled off. The transparent and viscous product with Mn=1750, Mw/Mn=1.8 was obtained. The yield was 12%

Example 3

Into a reactor with a stirrer and reflux condenser, dodecatungstophosphoric acid ($H_3PW_{12}O_4 \cdot 29H_2O$) (180 g )which had dissolved in pure water( 180 g) and cesium carbonate (21.548 g) (commercially available from NOAH Technologies Co.) which had dissolved in pure water (60 g) were charged, and Ludoxg® (36 g) (commercially available from Du Pont) was added, followed by stirring. The mixture was refluxed at 80° C. for 1 hours. After dryness, white cesium dodecatungstophosphate ($Cs_{2.5}H_{0.5}PW_{12}O_{40}$) was obtained. The above cesium salt powder was mixed uniformly with one percent by weight of polyvinyl alcohol solution (PVA, Chang Chun Petrochemical Co., LTD.) and the proper amount of water to extrude into a cylinder of 2 mm×10 mm. After dryness, the shaped catalyst ( 100 g) was placed into the fixed bed reactor, where the reaction temperature was kept at 60° C. The weight hourly space velocity of feeding tetrahydrofuran with 1000 ppm water content was 0.2 $hr^{-1}$. The product was collected, and the transparent and viscous product of polytetramethylene ether glycol with Mn=1600 was obtained. The yield was 20%.

Example 4

Cesium dodecatungstophosphate powder (100 g) which had been prepared in Example 3 was added with methyl cellulose( 0.5 g )( commercially available from Dow Chemical Co. as trade name METHOCELL®), silicone paste(0.5 g) (Dow Corning) and pure water (25 g). The mixture was mixed uniformly to extrude into a cylinder of 2 mm×10 mm. After drying, the shaped catalyst (80 g) was placed into the fixed bed reactor, where the reaction temperature was kept at 60° C. The weight hourly space velocity of feeding tetrahydrofuran with 0.05% of 1,4-butanediol was 0.2 $hr^{-1}$. The product was collected, and the viscous product of copolymerized polyether polyol with Mn 1100, Mw/Mn=2.4 was obtained. The yield was 10%

Example 5

Ammonium dodecatungstophosphate (10 g) which had been synthesized and silica ($SiO_2$) (10 g) were mixed uniformly and treated in the oven under a nitrogen gas atmosphere at 300° C. for 3 hours. Into a vessel with a stirrer and reflux condenser, the above catalyst, tetrahydrofuran (THF) (300 g) with 300 ppm water content and propylene oxide (5 g) were stirred and heated at 60° C. for 6 hours. After the completion of the reaction, the catalyst was filtrated off, the unreacted monomer THF was distilled off. The transparent and viscous product with Mn=960 was obtained. The yield was 10%.

Example 6

Cesium carbonate (21.2 g ) was dissolved in pure water (40 g) to prepare a cesium carbonate solution, then 1L by volume of the silica grain impregnated by dodecatungstophosphoric acid ($H_3PW_{12}O_{40}$/ $SiO_2$, available from N. E. Chemcat Co., i.e., the amount of impregnation of dodecatungstophosphoric acid is 150 g/L) was dropped in. The substance was mixed uniformly until all the liquid was soaked up and dried, then put in the oven and treated under a nitrogen gas atmosphere at 300° C. for 2 hours. The prepared catalyst was placed into a fixed bed reactor, where the reaction temperature was kept at 60° C. Tetrahydrofuran was fed at a flow rate of 0.2 $hr^{-1}$ by using a high-pressure pump. The product was collected, and the polytetramethylene ether glycol with Mn=1900, Mw/Mn=2.0 was obtained The yield was 15%

Example 7

Into a glass reactor with a stirrer and reflux condenser, dodecatungstophosphoric acid ($H_3PW_2O_{40} \cdot 29H_2O$) (150 g) which had dissolved in pure water (150 g) and 50 wt % cesium hydroxide aqueous solution (33.05 g) (commercially available from ACROS Co.) were charged, and Ludox® ( 15 g) (commercially available from Du Pont) was added, followed by stirring. The mixture was refluxed at 80° C. for 2 hours. After dryness, white silica-contained cesium slat ( $CS_{2.5}H_{0.5}PW_{12}O_{40}$) grains (141.5 g) were obtained. The obtained catalyst was pulverized into 8–16 mesh and treated in the oven under a nitrogen gas atmosphere at 200° C. for 2 hours. The treated catalyst (100 g) was placed into a fixed bed reactor, where the reaction temperature was kept at 60° C. The weight hourly space velocity of feeding commercial tetrahydrofuran was 0.2 $hr^{-1}$. The product was collected, and the transparent and viscous product of polytetramethylene ether glycol with Mn=1980, Mw/Mn=2.1 was obtained. The yield was 30%

What is claimed is:

1. A method for preparing polyether polyol or copolymerized polyether polyol, which uses an acid catalyst consisting of heteropoly acidic salts and oxides and/or binders, and allows tetrahydrofuran and/or cyclic ether compounds to carry out the ring-opening polymerization or ring-opening copolymerization with/without telogen, and obtains polyether polyol or copolymerized polyether polyol.

2. The method according to claim 1, wherein said cyclic ether is cyclic ether having 3 to 6 members and is represented in following formula:

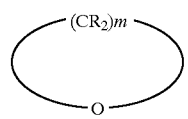

wherein each of R may be identical or different and may represent a hydrogen atom, halogen, $C_{1-10}$ alkyl, phenyl, and substituted phenyl or halogenated $C_{1-10}$ alkyl, respectively, and where m is an integer from 2 to 5.

3. The method according to claim 2, wherein one of said cyclic ether is propylene oxide.

4. The method according to claim 1, wherein the temperature of polymerization is 30° C. to 80° C.

5. The method according to claim 1, wherein the pressure of polymerization is 1 to 10 atmospheres.

6. The method according to claim 1, wherein the amount of said catalyst ranges from 1/100 to 10 times against the weight of the cyclic ether.

7. The method according to claim 1, wherein said polymerization is carried out with a fluidized bed, a fixed bed or a stir reactor.

8. The method according to claim 7, wherein said polymerization is carried out with a fixed bed reactor.

9. The method according to claim 8, wherein the weight hourly space velocity of feeding the cyclic ether is 0.005 to 5 $hr^{-1}$.

10. The method according to claim 1, wherein said heteropoly acidic salts are selected from heteropoly acidic salts consisting of ammonium salts, alkali salts, alkaline earth metal salts, boron salts, aluminum salts, indium salts, copper salts, chromium salts, nickel salts, bismuth salts and zirconium salts, and their composition thereof; therein said heteropoly acids are formed in condensation with oxyacids containing at least one element selected from molybdenum, tungsten and vanadium, and oxyacids containing at least one element selected from phosphorous, silicon, boron, arsenic, germanium, wherein the former and the latter elements are in the ratio of 2.5 to 12 by the number of atom.

11. The method according to claim 10, wherein said heteropoly acids are selected from a group consisting of 12-molybdophosphoric acid ($H_3PMo_{12}O_{40}$), 12-tungstophosphoric acid ($H_3PW_{12}O_{40}$), 12-tungstosilicic acid ($H_4SiW_{12}O_{40}$), 12-molybdosilicic acid ($H_4SiMo_{12}O_{40}$), 12-tungstoboric acid ($H_5BW_{12}O_{40}$), 12-vanadatophosphoric acid ($H_7PV_{12}O_{36}$), 12-tungstoarsenic acid ($H_3AsW_{12}O_{40}$), 12-tungstogermanic acid ($H_4GeW_{12}O_{40}$), 18-tungsto-2-phosphoric acid ($H_6P_2W_{18}O_{62}$), 18-tungsto-2-arsenic acid ($H_6As_2Mo_{18}O_{62}$), 18-molybdo-2-phosphoric acid ($H_6P_2Mo_{18}O_{62}$), 18-molybdo-2-arsenic acid ($H_6As_2Mo_{18}O_{62}$), 9-molybdophosphoric acid ($H_3PMo_9O_{31}$), 10-molybdatodivanadatophosphoric acid ($H_5Mo_{10}V_2O_{40}$) and 11-molybdo-1-vanadophosphoric acid ($H_4PMo_{11}VO_{40}$), and their composition thereof.

12. The method according to claim 11, wherein said heteropoly acid are selected from a group consisting of 12-tungstophosphoric acid, 12-molybdophosphoric acid, 12-tungstosilicic acid and 12-molybdosilicic acid, and their composition thereof.

13. The method according to claim 10, wherein said heteropoly acidic salts are ammonium salts or alkali salts.

14. The method according to claim 13, wherein said heteropoly acidic salts are ammonium salts of 12-tungstophosphoric acid.

15. The method according to claim 13, wherein said heteropoly acidic salts are cesium salts of 12-tungstophosphoric acid.

16. The method according to claim 1, wherein said oxides are acidic oxides.

17. The method according to claim 16, wherein said oxides are selected from a group consisting of titanium oxide ($TiO_2$), zirconium oxide ($ZrO_2$), vanadium oxide ($V_2O_5$), antimony trioxide ($Sb_2O_3$), silica ($SiO_2$), aluminum oxide ($Al_2O_3$), molybdenum oxide ($MoO_3$) and tungsten trioxide ($WO_3$), and their composition thereof.

18. The method according to claim 1, wherein said oxides and heteropoly acidic salts are in the ratio of 1/100 to 100/1 by weight.

19. The method according to claim 1, wherein said binders are selected from a group consisting of starch, methyl cellulose, hydroxyethyl cellulose, polyvinyl alcohol, ethylene-vinyl alcohol copolymer, ethylene-vinyl acetate copolymer, silicone resin and their composition thereof.

20. The method of claim 1 wherein the ring-opening polymerization or ring-opening copolymerization occurs in the absence of telogen.

21. The method of claim 1 wherein the ring-opening polymerization or ring-opening copolymerization occurs in the absence of water.

22. A method for preparing polyether polyol or copolymerized polyether polyol, comprising: reacting a cyclic ether compound with an acid catalyst that contains a heteropoly acidic salt and oxide or binder to provide a polyether or a copolymerized polyether polyol.

23. The method of claim 22 wherein a tetrahydrofuran compound is reacted with the acid catalyst.

24. The method of claim 22 the catalyst consists of a heteropoly acid salt.

25. The method of claim 22 wherein the cyclic ether compound undergoes a ring-opening polymerization in the absence of telogen.

26. The method of claim 22 wherein the cyclic ether compound reacts with the acid catalyst in the absence of water.

27. The method of claim 22 wherein the heteropoly acidic salt and oxide is present in a ratio of 1/100 to 100/1 by weight.

28. The method of claim 22 wherein the oxide is an acidic oxide composition.

29. The method of claim 22 wherein the oxide is titanium oxide, zirconium oxide, vanadium oxide, antimony trioxide, silica, aluminum oxide, molybdenum oxide or tungsten oxide.

* * * * *